United States Patent [19]
Jennings et al.

[11] Patent Number: 5,709,448
[45] Date of Patent: Jan. 20, 1998

[54] SEAT BACK POCKET LIGHT

[75] Inventors: Kurt Lynn Jennings, Warren; Neil Duane Wolfe, Niles, both of Ohio

[73] Assignee: General Motors Corporation, Detroit, Mich.

[21] Appl. No.: 709,792

[22] Filed: Sep. 9, 1996

[51] Int. Cl.$^6$ ............................................. F21V 7/04
[52] U.S. Cl. .................... 362/32; 362/75; 362/156
[58] Field of Search ..................... 362/32, 154, 156, 362/75

[56] References Cited

U.S. PATENT DOCUMENTS

| | | | |
|---|---|---|---|
| 2,554,603 | 5/1951 | Terlinde | 362/156 |
| 4,234,907 | 11/1980 | Daniel | 362/32 |
| 5,042,900 | 8/1991 | Parker | 385/76 |
| 5,424,926 | 6/1995 | Myers | 362/156 |

*Primary Examiner*—Carroll B. Dority
*Attorney, Agent, or Firm*—Cary W. Brooks

[57] ABSTRACT

Generally, the invention includes a seat having a back for supporting a passenger. A flap is secured to the seat back along three sides and having an open top thus defining a pocket between the flap and the seat back. A woven fiber optic panel is secured inside the pocket to the inside surface of the flap or the seat back surface. The woven fiber optic panel is connected to a remote light source by a fiber optic cable. The woven fiber optic panel not only provides direct lighting to see down into the pocket but may also be constructed and arranged to reflect off of the seat back at the mouth of the pocket to provide low intensity indirect lighting for the passenger compartment of the vehicle.

20 Claims, 2 Drawing Sheets

SEAT BACK POCKET LIGHT

TECHNICAL FIELD

This invention relates to vehicle lighting.

BACKGROUND OF THE INVENTION

A variety of vehicles include passenger seats with seat back pockets for storing a variety of items such as maps. These types of seat back pockets are very common on automobile seats. However, the ergonomic convenience of the pockets is reduced when the occupant cannot see down inside the fabric forming the pocket which is a problem particularly at night. Incandescent lights cannot be used because the bulbs and plastic parts break easily, get extremely hot and are bulky in size. Further, the repair of such incandescent lighting materials would be costly for the OEM or owner.

The present invention provides alternatives and advantages over the prior art.

SUMMARY OF THE INVENTION

Generally, the invention includes a seat having a back for supporting a passenger. A flap is secured to the seat back along three sides and having an open top thus defining a pocket between the flap and the seat back. A fiber optic line or panel is secured inside the pocket to the inside surface of the flap or the seat back surface. The fiber optic panel is connected to a remote light source by a fiber optic cable. The fiber optic panel not only provides direct lighting to see down into the pocket but may also be constructed and arranged to reflect off of the seat back at the mouth of the pocket to provide low intensity indirect lighting for the passenger compartment of the vehicle.

These and other objects, features and advantages of the present invention will become apparent from the following brief description of the drawings, detailed description and appended claims and drawings.

DETAILED DESCRIPTION

Figure 1:
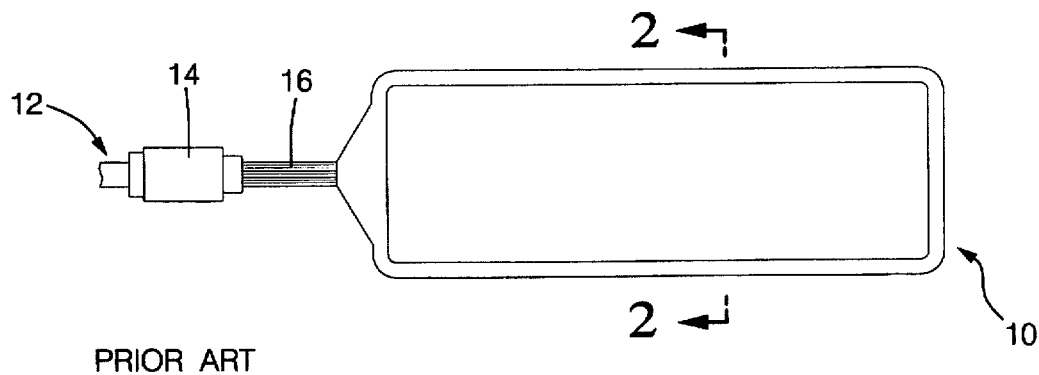
FIG. 1 illustrates a woven fiber optic panel useful in the present invention.

The invention includes a fiber optic line or panel secured inside of a pocket. A variety of fiber optic panels are useful in the present invention. In general, a plurality of fiber optic lines are employed and a destructive means is used to break the cladding and score the core of the fiber optic line thus causing light to leak out. This can be accomplished by abrading the fiber optic line, heat stamping, laser etching or a variety of other method that will be appreciated by those skilled in the art.

The same result can be accomplished using a woven fiber optic panel. A suitable woven fiber optic panel is available from Lumitex, Inc., and is disclosed in Parker, U.S. Pat. No. 5,042,900, entitled "Connector Assemblies for Optical Fiber Light Cables," issued Aug. 27, 1991, a disclosure of which is hereby incorporated by reference. A suitable woven fiber optic panel assembly includes at least one light emitting panel 10 having a light cable 12 at one end to transmit light from a remote light source (not shown) to the light emitting panel. At the outermost end of the optical cable 12 is a connector assembly 14 which serves as an interface between the light source and a plurality of fiber optic lines 16.

Each light emitting panel can be made of one or more layers of optical fibers which may be woven into a sheet or mat in a manner disclosed, in U.S. Pat. No. 4,234,907 granted to Maurice Daniel on Nov. 18, 1980, the disclosure of which is hereby incorporated by reference. Preferably the optical fibers 16 of each layer are woven only in the warp direction, with fill threads 18 woven in the weft direction. However, it should be understood that the fill threads 18 could also be optical fibers if desired. The weft threads are the threads usually carried by the shuttle of a weaving loom, whereas the warp threads extend lengthwise of the loom, crossed by the weft threads. The panel may include a transparent coating 19 adjacent the woven fiber and a reflective coating 21 adjacent the transparent coating 19.

Figure 2:
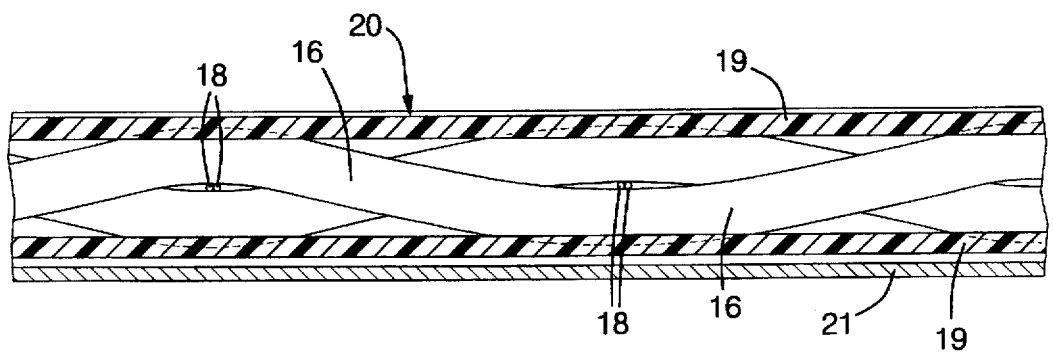
FIG. 2 is a partial sectional view taken along lines 2—2 of FIG. 1.
Figure 3:
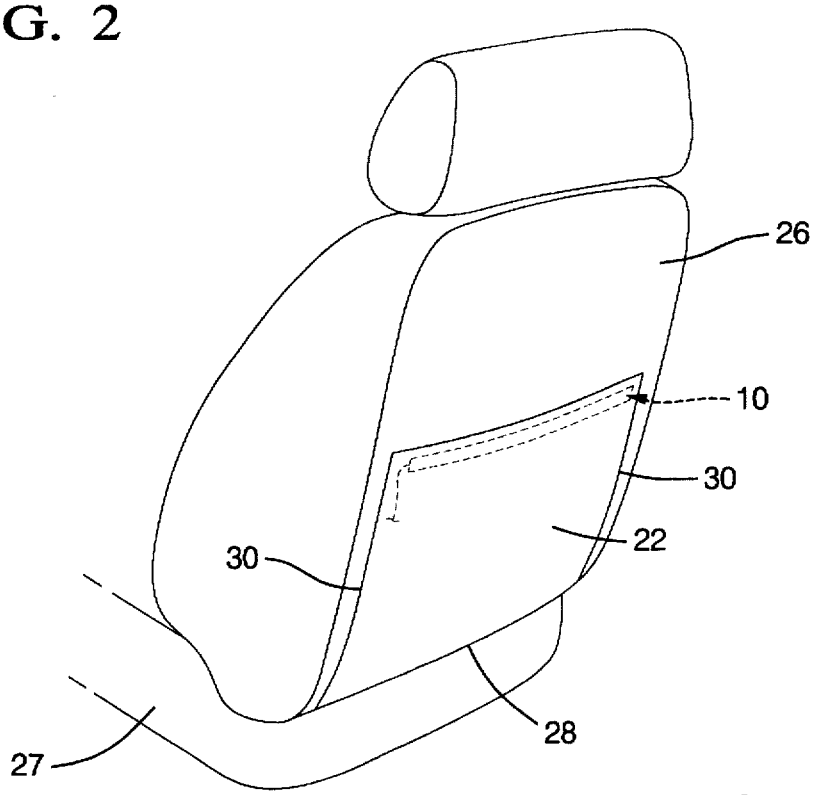
FIG. 3 illustrates a seat back pocket assembly according to the present invention.

Each optical fiber is of a type known to those skilled in the art and is made from one or more optical fibers strands each including a light transmitting core portion of a suitable transparent material and an outer sheath or cladding of a second transparent material having a relatively lower index of refraction than the core material to assist in preventing the escape of light along its path. The core material may be made of either glass or plastic or a multi-strand filament having the desired optical characteristics. The index of refraction of the outer sheath material is less than that of the core material whereby substantially total reflection is obtained at the sheath-core interface as is well known in the art. To cause the light to be emitted from each light emitting panel, the external surface of the optical fibers may be disrupted as by bending the optical fibers at a plurality of discrete locations along their lengths as schematically shown in FIG. 2 such that the angle of each bend 20 approximately exceeds the angle of internal reflections so that a portion of the light will be emitted at each bend.

Figure 4:
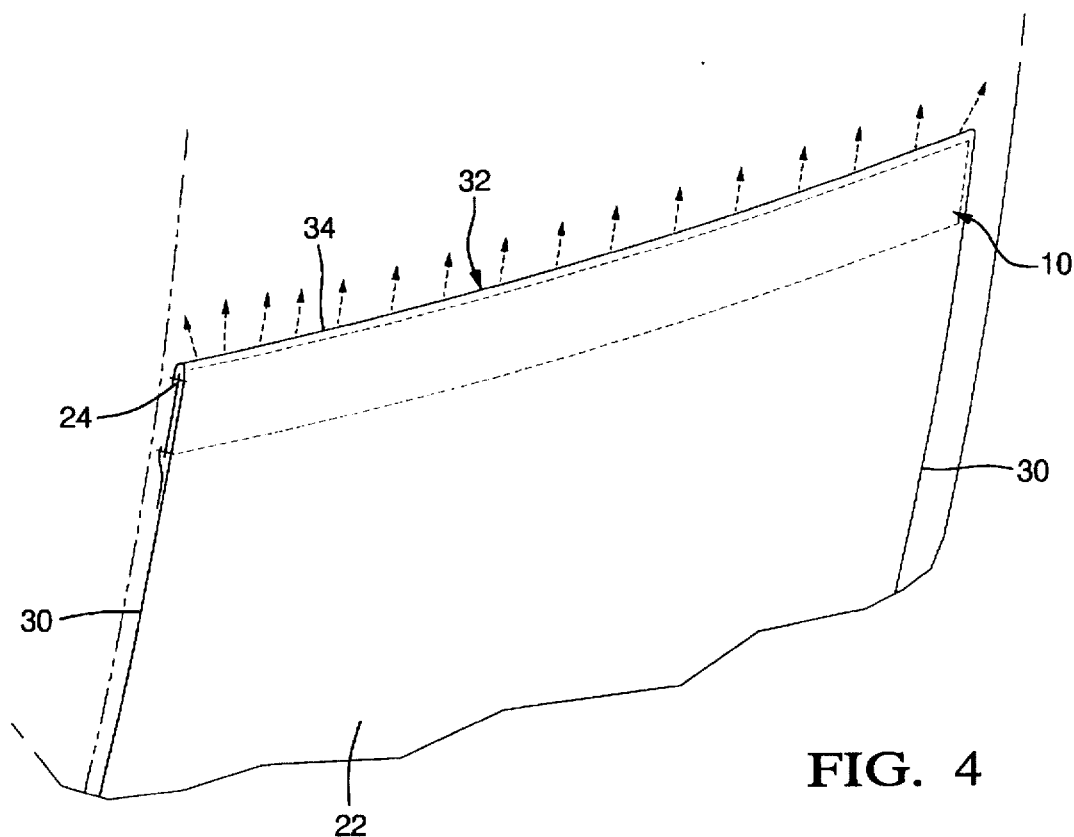
FIG. 4 illustrates the indirect lighting provided by the present invention when the pocket is in a normal quasi-closed position.
Figure 5:
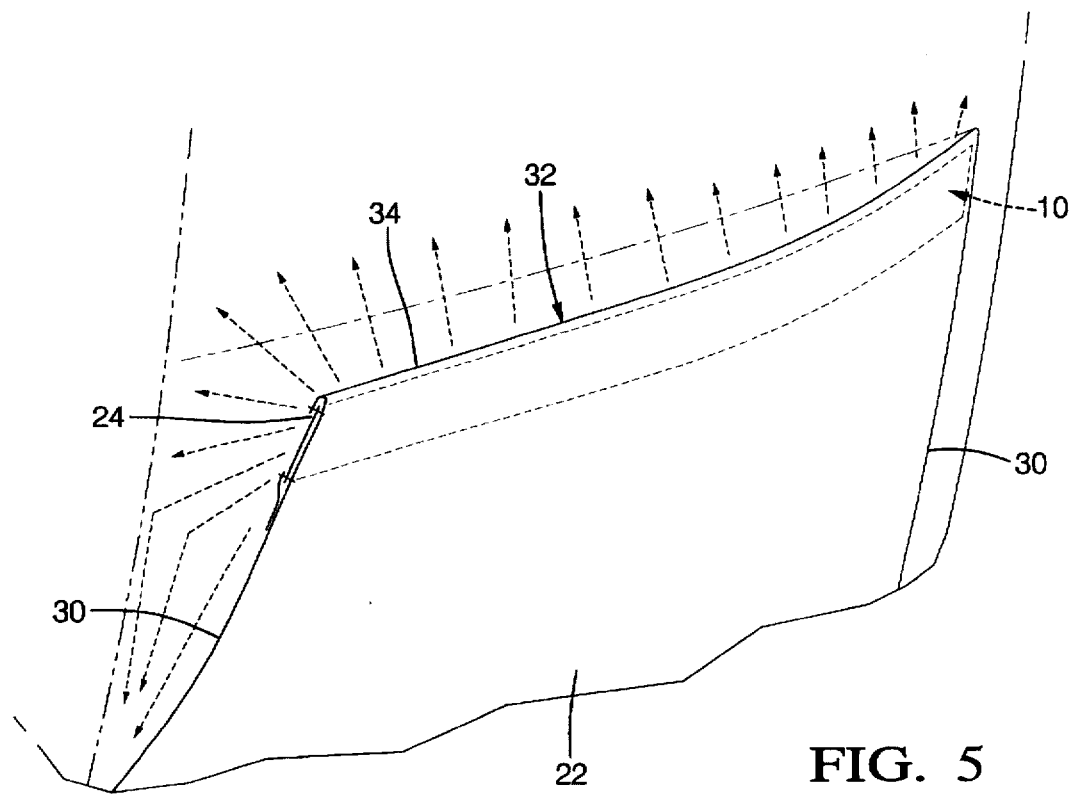
FIG. 5 illustrates the lighting provided by the present invention when a passenger opens the pocket.

FIG. 4 illustrates a flap 22 for making a seat back pocket according to the present invention. The flap includes an upper edge 24 which is folded over. A portion of the woven fiber optic panel 10 may be placed underneath the folded over edge 24 and stitched or otherwise secured in this position (i.e., the woven fiber optic panel is sewn into the hem of the pocket). The flap including the woven fiber optic panel secured thereto is attached to the seat back 26 (attached to a base 27) along the bottom edge 28 and two side edges 30. Preferably, the flap is secured to the seat back 26 in a manner which provides a slight gap 32 between the seat back and the top edge or mouth 34 of the flap. When so constructed, light from the woven fiber optic panel reflects off of the seat back and out of the mouth of the pocket to provide attractive low intensity indirect lighting for the passenger compartment of the vehicle when the pocket is in this first natural quasi-closed position as shown in FIG. 4. When a passenger pulls the flap away from the seat back to fully open the mouth of the pocket, the woven fiber optic panel provides light down into the pocket (FIG. 5). Such a pocket light may be useful in a variety of vehicles such as automobiles, trucks, buses, trains, planes, or any other vehicles carrying passengers and positioned on a seat back or other suitable panel.

We claim:

1. A pocket light assembly comprising a seat for supporting a passenger and having a seat base and an upwardly extending back, said seat back having a front surface and a rear surface, a flap secured to the seat rear surface along a bottom edge of the flap and two opposed sides of the flap, and the flap having a top edge free to define a pocket between the flap and the rear surface of the seat back and a fiber optic panel received in the pocket.

2. A pocket light assembly as set forth in claim 1 wherein said flap includes a portion folded over along a top edge and wherein a portion of said fiber optic panel is secured underneath the folded edge.

3. A pocket light assembly as set forth in claim 2 wherein a portion of the fiber optic panel is stitched in place underneath the folded over edge.

4. A pocket light assembly as set forth in claim 1 wherein the flap is constructed and arranged to provide a slight gap between the top edge of the flap to define a partially open mouth in a natural unretracted position so that light from the fiber optic panel reflects off the seat back and out of the partially open mouth to provide low intensity indirect lighting for the passenger compartment and to provide direct light down into the pocket when a passenger pulls the flap away from the seat back to fully open the mouth of the pocket.

5. A pocket light assembly as set forth in claim 1 wherein the fiber optic panel comprises a plurality of woven fiber optic lines.

6. A pocket light assembly as set forth in claim 1 wherein said panel comprises a plurality of fiber optic lines constructed and arranged to allow light to leak out at selective locations along the length of the line.

7. A pocket light assembly comprising a seat for supporting a passenger and having a seat base and an upwardly extending back, said seat having a front surface and a rear surface, a flap secured to the seat rear surface along a plurality of edges and having at least one edge free to define a pocket between the flap and the rear surface of the seat back, and a fiber optic line received in the pocket.

8. A pocket light assembly as set forth in claim 7 wherein said fiber optic line is constructed and arranged to allow light to leak out at selective locations along the length of the line.

9. A pocket light assembly comprising a panel substrate and a flap secured to the panel substrate along a plurality of edges and having at least one edge free to define a pocket between the panel and the flap, and a fiber optic panel received in the pocket, attached and extending along the free edge.

10. A pocket light assembly as set forth in claim 9 further comprising a remote light source connected to the fiber optic panel.

11. A pocket light assembly as set forth in claim 9 wherein the panel substrate forms part of a vehicle seat.

12. A pocket light assembly as set forth in claim 9 wherein the flap is constructed and arranged to provide a slight gap between the top edge of the flap and the panel substrate to define a partially open mouth in a natural unretracted position so that light from the fiber optic panel reflects off of the panel substrate and out of the partially open mouth to provide low intensity indirect lighting for the passenger compartment of the vehicle and to provide direct light down into the pocket when the passenger pulls the flap away from the panel substrate to fully open the mouth of the pocket.

13. A pocket light assembly as set forth in claim 1 wherein the fiber optic panel comprises a plurality of fiber optic lines with light being emitted at a plurality of locations along the length of the fiber optic lines in the fiber optic panel.

14. A pocket light assembly as set forth in claim 9 wherein the fiber optic panel comprises a plurality of fiber optic lines with light being emitted at a plurality of locations along the length of the fiber optic lines in the fiber optic panel.

15. A pocket light assembly as set forth in claim 13 wherein the fiber optic lines in the fiber optic panel are abraded at a plurality of locations to emit light at the location of the abrasion.

16. A pocket light assembly as set forth in claim 14 wherein the fiber optic lines in the fiber optic panel are abraded at a plurality of locations to emit light at the location of the abrasion.

17. A pocket light assembly as set forth in claim 1 comprising a plurality of woven fiber optic lines.

18. A pocket light assembly as set forth in claim 9 comprising a plurality of woven fiber optic lines.

19. A pocket light assembly as set forth in claim 1 wherein the fiber optic panel comprises a plurality of fiber optic lines, a plurality of the fiber optic lines having a plurality of bends formed therein along the length of the lines at an angle so that a portion of light is emitted from each bend.

20. A pocket light assembly as set forth in claim 9 wherein the fiber optic panel comprises a plurality of fiber optic lines, a plurality of the fiber optic lines having a plurality of bends formed therein along the length of the lines at an angle so that a portion of light is emitted from each bend.

\* \* \* \* \*